(12) United States Patent
Wu et al.

(10) Patent No.: US 8,254,111 B2
(45) Date of Patent: Aug. 28, 2012

(54) MOUNTING ASSEMBLY FOR PACKAGING AND SHIPPING COMPUTER COMPONENTS

(75) Inventors: Hung-Yi Wu, Taipei Hsien (TW); Lei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 149 days.

(21) Appl. No.: 12/871,936

(22) Filed: Aug. 31, 2010

(65) Prior Publication Data
US 2012/0044629 A1    Feb. 23, 2012

(30) Foreign Application Priority Data

Aug. 19, 2010   (CN) .......................... 2010 1 0257425

(51) Int. Cl.
*H05K 7/20* (2006.01)

(52) U.S. Cl. .............. 361/679.46; 361/679.49; 361/688; 361/690; 361/709; 165/80.3

(58) Field of Classification Search .................. None
See application file for complete search history.

(56) References Cited

U.S. PATENT DOCUMENTS

| | | | | |
|---|---|---|---|---|
| 6,062,301 | A * | 5/2000 | Lu | 165/80.3 |
| 6,798,656 | B1 * | 9/2004 | Lin | 361/690 |
| 7,839,639 | B2 * | 11/2010 | Najbert | 361/695 |
| 8,081,470 | B2 * | 12/2011 | Oki et al. | 361/715 |
| 8,120,906 | B2 * | 2/2012 | Li | 361/679.58 |
| 2002/0051338 | A1 * | 5/2002 | Jiang et al. | 361/685 |
| 2003/0193778 | A1 * | 10/2003 | Staiano | 361/687 |
| 2008/0302622 | A1 * | 12/2008 | Ohtake et al. | 188/379 |
| 2009/0237882 | A1 * | 9/2009 | Lin et al. | 361/697 |

* cited by examiner

*Primary Examiner* — Courtney Smith
(74) *Attorney, Agent, or Firm* — Altis Law Group, Inc.

(57) ABSTRACT

An air duct installed in a chassis is configured to have a heat dissipating device mounted thereon during shipping. The heat dissipating device defining a number of mounting holes corresponding to a number of fixing members extending from a surface of the air duct to accomplish the mounting. Thereby, the heat dissipating device may be conveniently and securely packaged and transported with the air duct and chassis.

11 Claims, 5 Drawing Sheets

MOUNTING ASSEMBLY FOR PACKAGING AND SHIPPING COMPUTER COMPONENTS

BACKGROUND

1. Technical Field

The present disclosure relates to a mounting assembly for packaging and shipping computer components.

2. Description of Related Art

In some cases, people may want to assemble computer systems themselves with parts from different sources. For example, someone may want to order the system chassis from one company and the motherboard and CPU from another company. In such circumstances, components of heat dissipating devices for the computer system that would be used to cool the CPU may be packed separately from the other components, which add to the cost of shipping.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
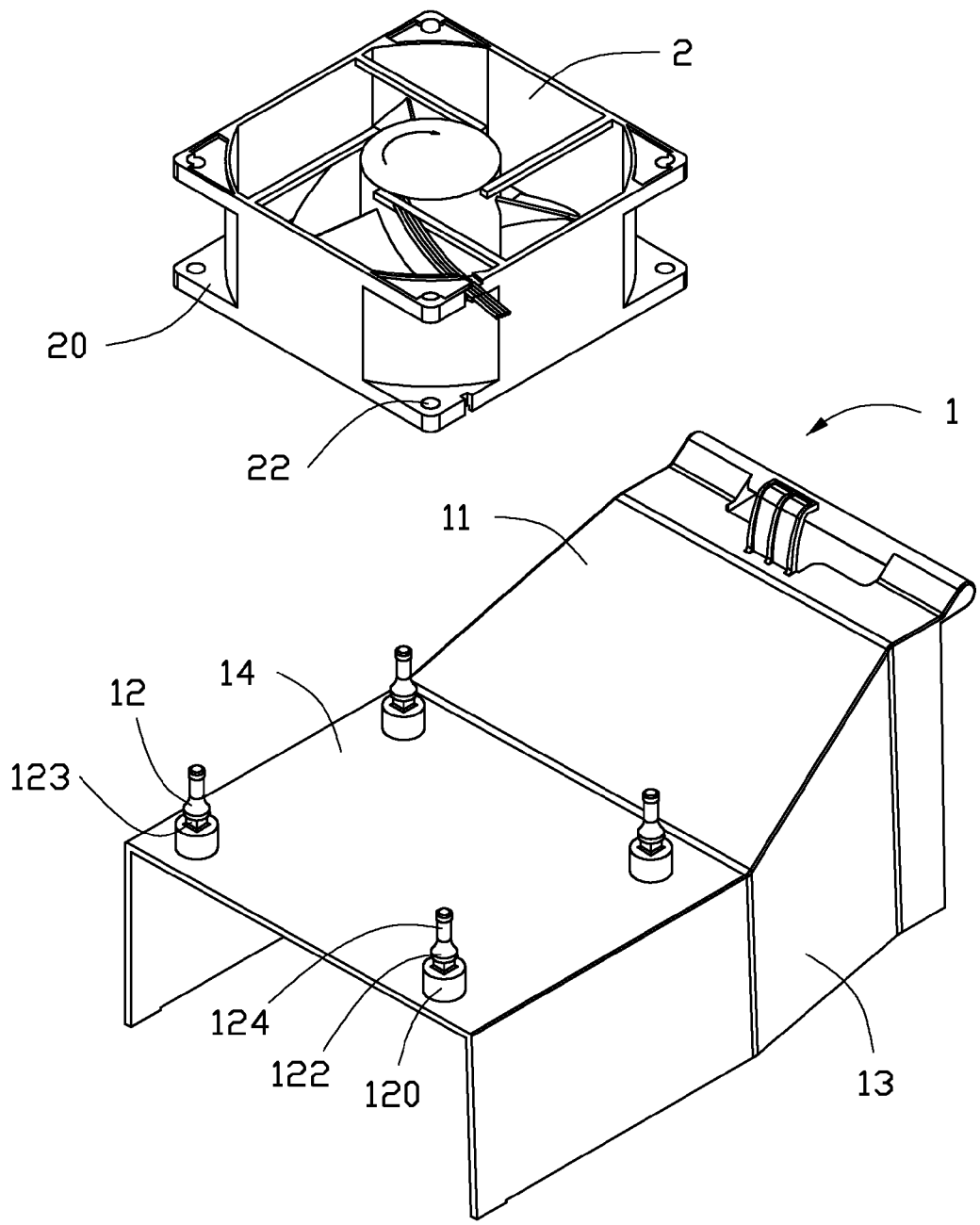
FIG. 1 is an exploded, isometric view of a first exemplary embodiment of an air duct, together with a first heat dissipating device.
Figure 2:
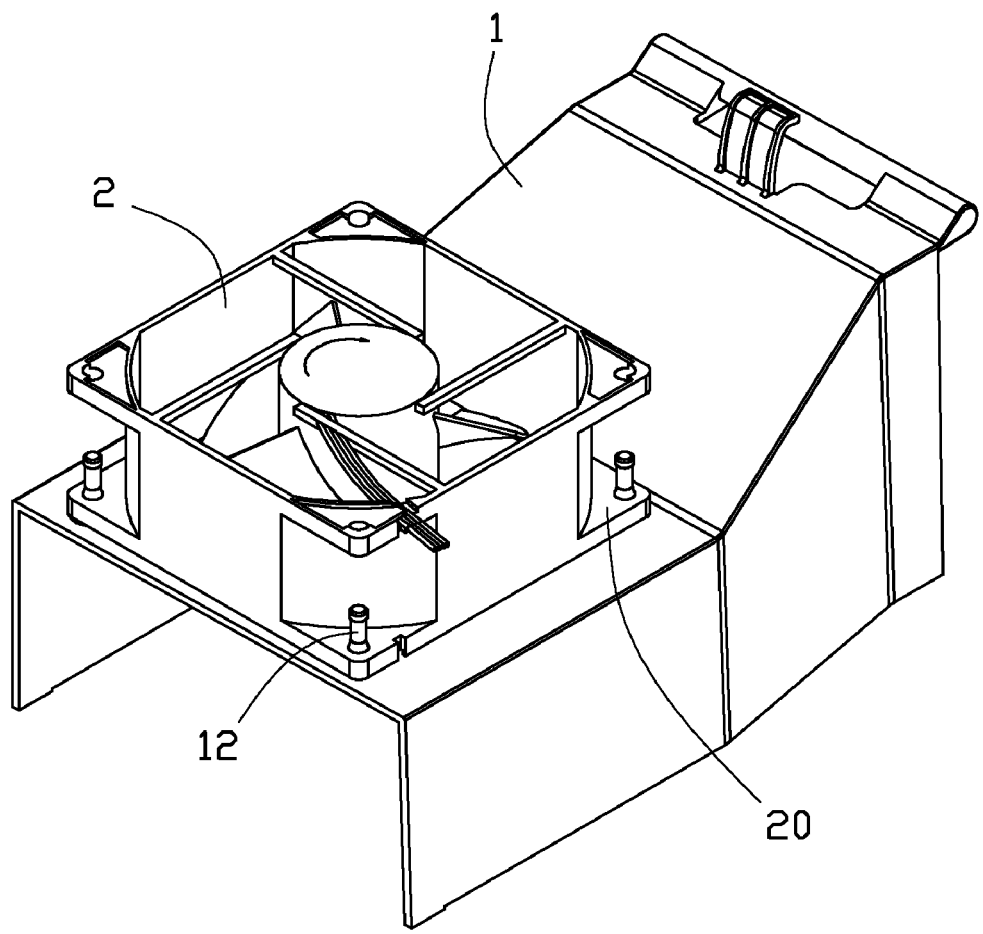
FIG. 2 is an assembled, isometric view of the air duct and the first heat dissipating device of FIG. 1.

Referring to FIG. 1, in a first exemplary embodiment, a first heat dissipating device 2, which can be used for dissipating heat from a component in a computer such as a CPU, is temporarily mounted on a computer component 1 for convenient shipping. In this embodiment, the first heat dissipating device 2 is a fan defining a mounting hole 22 in each of four corners 20 of the fan, and the computer component 1 is an air duct. In a computer system, the air duct aligns with the fan to guide airflow from the fan.

The computer component 1 includes a top wall 11, and two sidewalls 13 substantially perpendicularly extending down from opposite sides of the top wall 11. The top wall 11 includes a flat installation portion 14. Four resilient fixing members 12 extend up from four corners of the installation portion 14, respectively. In one embodiment, the fixing members 12 are made of plastic. Each fixing member 12 includes a column-shaped base 120 extending up from the installation portion 14, a tapered blocking portion 122 extending up from a top of the base 120, and a column 124 extending up from a top of the blocking portion 122. A peripheral slot 123 is defined between the blocking portion 122 and the base 120.

In assembly, the columns 124 of the fixing members 12 extend through the corresponding mounting holes 22 of the heat dissipating device 2, and the sides bounding the corresponding mounting holes 22 move along the corresponding blocking portions 122 to engage in the corresponding slots 123. Therefore, the heat dissipating device 2 is mounted to the computer component 1.

In disassembling the heat dissipating device 2 from the computer component 1, the fixing members 12 are deformed to disengage from the corresponding mounting holes 22 of the first heat dissipating device 2.

Figure 3:
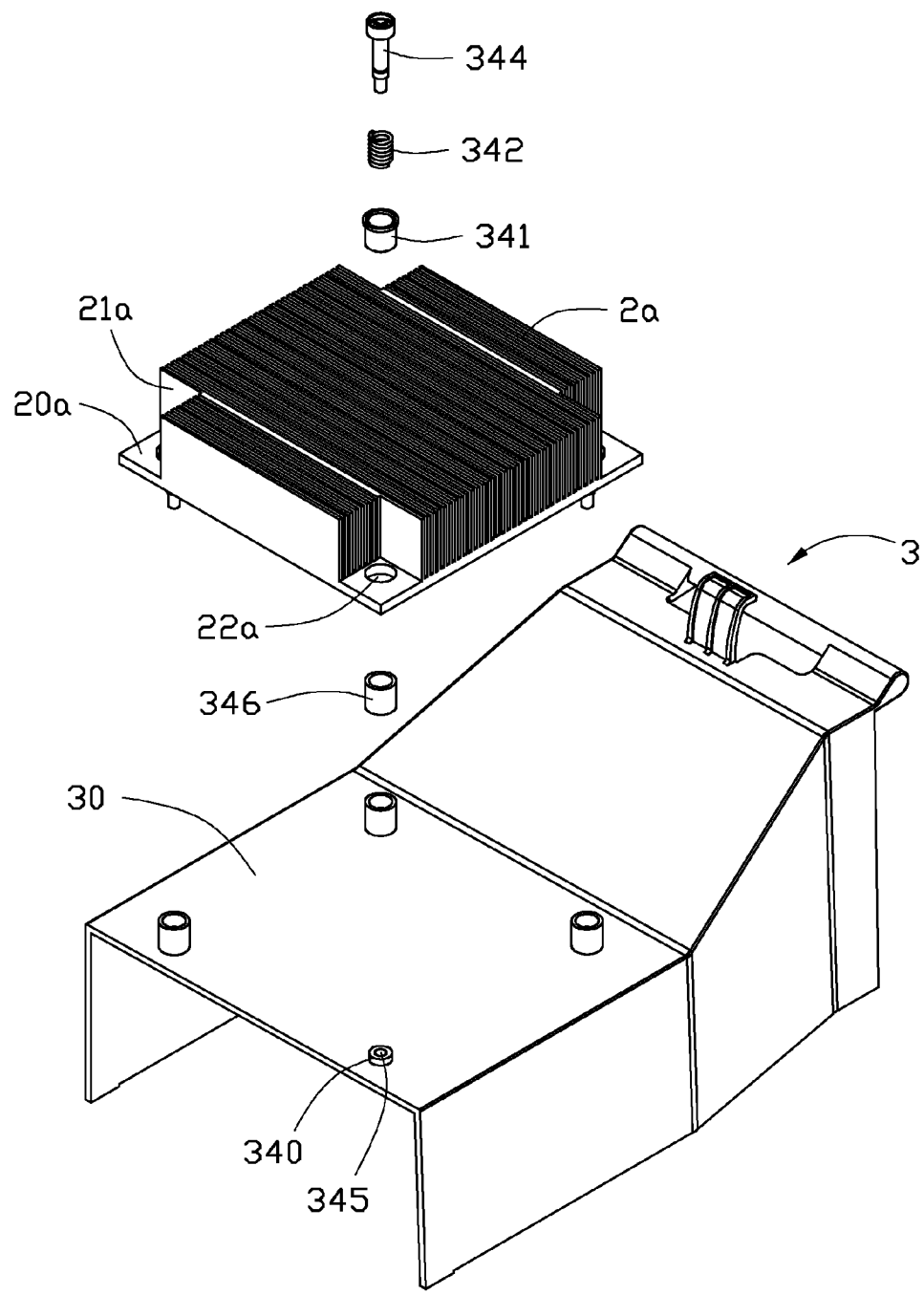
FIG. 3 is an exploded, isometric view of a second exemplary embodiment of an air duct, together with a second heat dissipating device.
Figure 4:
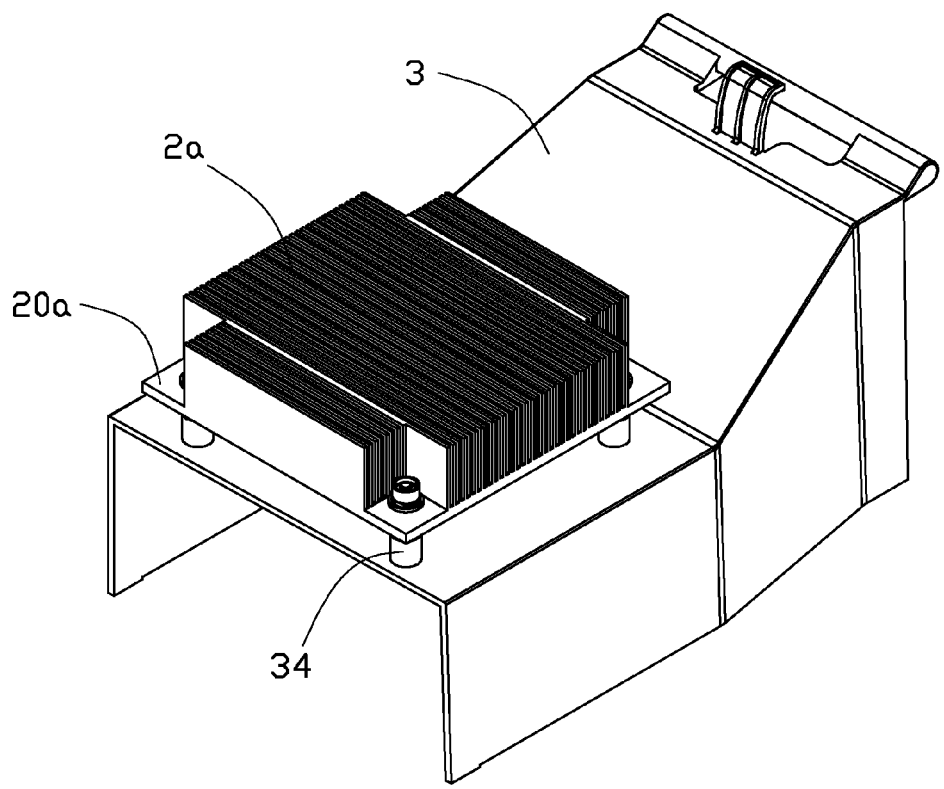
FIG. 4 is an assembled, isometric view of the air duct and the second heat dissipating device of FIG. 3.

Referring to FIG. 3 and FIG. 4, in a second exemplary embodiment, a second heat dissipating device 2a is generally the same as the first heat dissipating device 1 and is temporarily mounted on a computer component 3. In this embodiment, the second heat dissipating device 2a is a heat sink and includes a square board 20a and a plurality of fins 21a extending up from the board 20a. A mounting hole 22a is defined in each corner of the board 20a. The computer component 3 is substantially the same as the computer component 1 of the first embodiment, except for fixing members 34. In the embodiment, each fixing member 34 includes a post 340 extending up from an installation portion 30 of the computer component 3 and axially defining a fastening hole 345, a cylinder-shaped shockproof portion 341, a spring 342, a fastener 344, and a shockproof casing 346. The shockproof casing 346 is mounted on the installation portion 30 and fits about the post 340. The shockproof portion 341, the spring 342, and the shockproof casing 346 may counteract shock and vibration occurring during transport.

In assembly, the shockproof portions 341 extend through the corresponding mounting holes 22a of the heat dissipating device 2a, the springs 342 are inserted into the corresponding shockproof portions 341, and then the fasteners 344 extend through the corresponding springs 342, and engage in the fastening holes 345 of the corresponding posts 340, thereby the heat dissipating device 2a is mounted to the computer component 3. Opposite ends of the spring 342 and the shockproof portions 341 resist against a head of the fastener 344 and the top of the shockproof casing 346.

Figure 5:
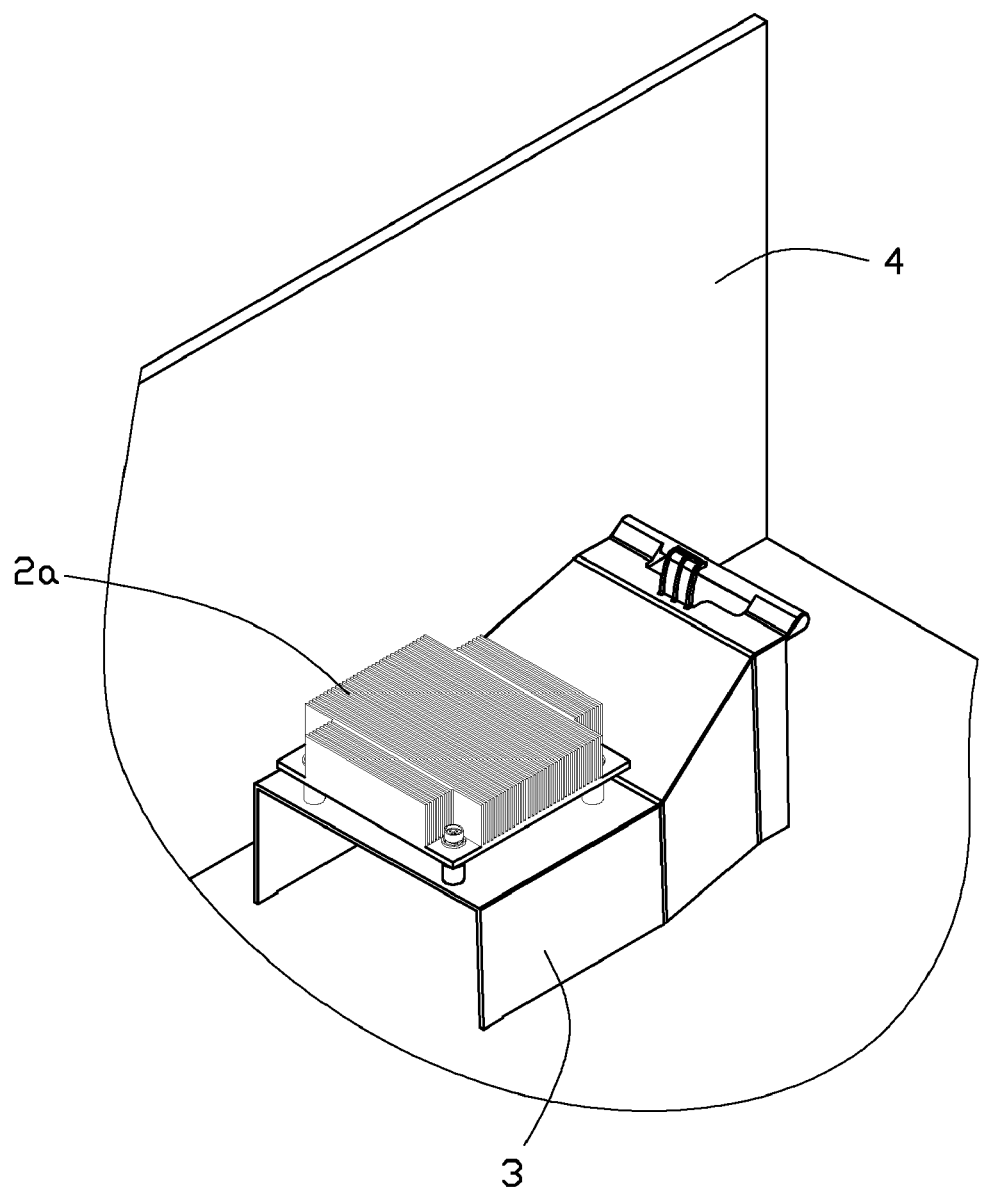
FIG. 5 is an assembled, isometric view of the air duct and the second heat dissipating device of FIG. 4 installed in a chassis.

Referring to FIG. 5, in use, the computer component 3 together with the heat dissipating device 2a is installed in a chassis 4, and then the heat dissipating device 2a can be transported with the chassis 4.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting assembly for computer component packaging and shipping comprising:

a chassis;

a computer component installed in the chassis, wherein the computer component comprises a top wall, two sidewalls extending down from opposite sides of the top wall and a plurality of fixing members;

a heat dissipating device defines a mounting hole in each of a plurality of corners thereof;

wherein the fixing members of the computer component extend through corresponding mounting holes of the heat dissipating device to mount the heat dissipating device to the computer component temporarily, thereby the heat dissipating device is installed to the chassis and transported with the chassis; and wherein each of the plurality of fixing members comprises a post extending up from the top wall and axially defining a fastening hole and a fastener, the fastener extends through a corresponding mounting hole of the heat dissipating device to engage in the fastening hole of the post, thereby to mount the heat dissipating device to the computer component temporarily.

2. The mounting assembly for packaging and shipping computer components of claim 1, wherein each of the plurality of fixing members comprises a base extending up from the top wall, and a blocking portion extending up from a top of the base, wherein a peripheral slot is defined between the blocking portion and the base, the heat dissipating device is engaged in the slots of the plurality of fixing members.

3. The mounting assembly for packaging and shipping computer components of claim 2, wherein the plurality of fixing members is made of elastic material.

4. The mounting assembly for packaging and shipping computer components of claim 3, wherein the elasticity material is plastic.

5. The mounting assembly for packaging and shipping computer components of claim 2, wherein each of the plurality of fixing members further comprises a column extending up from a top of the blocking portion, and the blocking portion is tapered.

6. The mounting assembly for packaging and shipping computer components of claim 1, wherein each of the plurality of fixing members further comprises a shockproof casing mounted on the installation portion and fitting about the post, a column-shaped shockproof portion inserted in the mounting hole of the heat dissipating device, an elastic member inserted in the shockproof portion, wherein the elastic member fits about the fastener, and opposite ends of the elastic member and the shockproof portion resist against a top of the shockproof casing and the fastener.

7. An air duct comprising:
a top wall comprises an installation portion;
two sidewalls extending down from opposite sides of the top wall; and
a plurality of fixing members;
wherein the plurality of fixing members is operable to extend through a plurality of corresponding mounting holes of a heat dissipating device, thereby to mount the heat dissipating device to the air duct; and
wherein each of the plurality of fixing members comprises a post extending up from the installation portion and axially defining a fastening hole and a fastener, the fastener extends through a corresponding mounting hole of the heat dissipating device to engage in the fastening hole of the post, thereby to mount the heat dissipating device to the air duct.

8. The air duct of claim 7, wherein each of the plurality of fixing members comprises a base extending up from the installation portion, and a blocking portion extending up from a top of the base, wherein a peripheral slot is defined between the blocking portion and the base, the heat dissipating device are engaged in the slots of the plurality of fixing members.

9. The air duct of claim 8, wherein the plurality of fixing members are made of elastic material.

10. The air duct of claim 8, wherein each of the plurality of fixing members further comprises a column extending up from a top of the blocking portion, and the blocking portion is tapered.

11. The air duct of claim 7, wherein each of the plurality of fixing members further comprises a shockproof casing mounted on the installation portion and fitting about the post, a column-shaped shockproof portion inserted in the mounting hole of the heat dissipating device, an elastic member inserted in the shockproof portion, wherein the elastic member fits about the fastener, and opposite ends of the elastic member resist against a top of the shockproof casing and the fastener.

\* \* \* \* \*